United States Patent
Gu et al.

(10) Patent No.: US 9,848,326 B2
(45) Date of Patent: Dec. 19, 2017

(54) MOBILE TERMINAL, AND SAFETY VERIFICATION METHOD AND DEVICE FOR MOBILE PAYMENT

(71) Applicant: ZTE CORPORATION, Shenzhen, Guangdong Province (CN)

(72) Inventors: Mingtao Gu, Shenzhen (CN); Gang Xu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/896,544

(22) PCT Filed: Sep. 30, 2013

(86) PCT No.: PCT/CN2013/084779
§ 371 (c)(1),
(2) Date: Dec. 7, 2015

(87) PCT Pub. No.: WO2014/194592
PCT Pub. Date: Dec. 11, 2014

(65) Prior Publication Data
US 2016/0150408 A1  May 26, 2016

(30) Foreign Application Priority Data
Jun. 7, 2013 (CN) .......................... 2013 1 0225887

(51) Int. Cl.
*H04M 1/66* (2006.01)
*H04M 1/68* (2006.01)
(Continued)

(52) U.S. Cl.
CPC .............. *H04W 12/06* (2013.01); *H04B 5/00* (2013.01); *H04W 4/008* (2013.01)

(58) Field of Classification Search
CPC .......... H04W 12/06; H04W 4/008; H04B 5/00
See application file for complete search history.

(56) References Cited

U.S. PATENT DOCUMENTS

| 2009/0098825 A1 | 4/2009 | Huomo et al. |
| 2009/0215385 A1 | 8/2009 | Waters et al. |

(Continued)

FOREIGN PATENT DOCUMENTS

| CN | 102790632 A | 12/2012 |
| CN | 103081370 A | 1/2013 |

OTHER PUBLICATIONS

International Search Report (Form PCT/ISA/210) for PCT/CN2013/084779 dated Mar. 13, 2014.
(Continued)

*Primary Examiner* — Ajit Patel
(74) *Attorney, Agent, or Firm* — Koppel, Patrick, Heybl & Philpott

(57) ABSTRACT

Provided are a mobile terminal, and a safety verification method and device for mobile payment. The mobile terminal includes a payment card and an NFC chip, also includes: a conduction switch coupled between the payment card and the NFC chip, and configured to receive a control signal from a processor and control, according to the control signal, closing or opening of a conduction path between the financial card and the NFC chip; and the processor, which is configured to verify, before the financial card transacts with an external reader, verification information input by a user; generate, when the verification information input by the user passes the verification, a control signal for controlling the conduction switch to open the conduction path, and generate, when the verification information input by the user does not pass the verification, a control signal for controlling the conduction switch to close the conduction path.

14 Claims, 4 Drawing Sheets

(51) Int. Cl.
*H04M 3/16* (2006.01)
*H04W 12/06* (2009.01)
*H04B 5/00* (2006.01)
*H04W 4/00* (2009.01)

(56) References Cited

U.S. PATENT DOCUMENTS

| | | | | |
|---|---|---|---|---|
| 2011/0165859 A1* | 7/2011 | Wengrovitz | ........ | H04M 1/7253 |
| | | | | 455/411 |
| 2012/0135681 A1* | 5/2012 | Adams | ................ | H04B 5/0025 |
| | | | | 455/41.1 |
| 2013/0200999 A1* | 8/2013 | Spodak | .................... | G05B 1/01 |
| | | | | 340/5.65 |
| 2014/0189821 A1* | 7/2014 | Ying | .................... | H04W 12/04 |
| | | | | 726/5 |

OTHER PUBLICATIONS

Extended European Search Report from European Patent Appl. No. 13886336.0, dated Mar. 18, 2016.

* cited by examiner

MOBILE TERMINAL, AND SAFETY VERIFICATION METHOD AND DEVICE FOR MOBILE PAYMENT

TECHNICAL FIELD

The present disclosure relates to the field of mobile payments, and in particular to a mobile terminal, and a safety verification method and device for mobile payment.

BACKGROUND

At present, a main application scenario of short distance wireless communication (which is also called as near field communication (NFC)) is a card swiping payment function. In order to ensure the security of a payment transaction, an NFC mobile phone needs to be equipped with a secure element (SE). At present, the mainstream NFC payment scheme is building the SE in a subscriber identity module (SIM) card. However, when the mobile phone is lost, a person could use the lost mobile phone illegally to perform card swiping services freely.

Aiming at the problem above in the related art, no effective solution has been proposed at present.

SUMMARY

Aiming at the problem that the safety guarantee effect of the mobile payment scheme in the related art is poor, etc., provided are a mobile terminal, and a safety verification method and device for mobile payment, so as to at least solve the problems above.

According to one aspect of the embodiments of the present disclosure, provided is a mobile terminal, including a financial card, which is used for mobile payment, and an NFC chip. The mobile terminal further includes a conduction switch, which is coupled between the financial card and the NFC chip, and is configured to receive a control signal from a processor and control, according to the control signal, closing or opening of a conduction path between the financial card and the NFC chip; and the processor, which is coupled with the conduction switch and is configured to verify, before the financial card transacts with an external reader, verification information input by a user, generate, when the verification information input by the user passes the verification, a control signal for controlling the conduction switch to open the conduction path, and generate, when the verification information input by the user does not pass the verification, a control signal for controlling the conduction switch to close the conduction path.

In an example embodiment, the mobile terminal above further includes: a display module, which is coupled with the processor and is configured to prompt, in a form of an interface, the user to input correct verification information when an initial state of the conduction path is that the conduction path is closed or when the verification information input by the user does not pass the verification.

In an example embodiment, the processor is further configured to generate, after the transaction is successful, a control signal for controlling to close the conduction path.

In an example embodiment, the financial card includes one of the following: a subscriber identity module (SIM) card with a built-in secure element (SE) and a financial integrated circuit (IC) card.

According to another aspect of the embodiments of the present disclosure, provided is a safety verification method for mobile payment, which is implemented through a conduction switch, which is coupled between an NFC chip and a financial card used for mobile payment, in a mobile terminal. The method includes: verifying, before the financial card transacts with an external reader, verification information input by a user; and controlling the conduction switch to open or close a conduction path between the financial card and the NFC chip according to a verification result, when the verification result is that the verification information input by the user passes the verification, controlling the conduction switch to open the conduction path, and when the verification result is that the verification information input by the user does not pass the verification, controlling the conduction switch to close the conduction path.

In an example embodiment, the method above further includes: prompting, in a form of an interface, the user to input correct verification information when an initial state of the conduction path is that the conduction path is closed or when the verification information input by the user does not pass the verification.

In an example embodiment, the method above further includes: after the transaction is successful, controlling to close the conduction path through the conduction switch.

According to yet another aspect of the embodiments of the present disclosure, provided is a safety verification device for mobile payment, which is implemented through a conduction switch, which is coupled between a near field communication (NFC) chip and a financial card used for mobile payment, in a mobile terminal. The device includes: a verification module, which is configured to verify, before the financial card transacts with an external reader, verification information input by a user; and a control module, which is configured to control the conduction switch to open or close a conduction path between the financial card and the NFC chip according to a verification result, wherein when the verification result is that the verification information input by the user passes the verification, the control module is configured to control the conduction switch to open the conduction path, and when the verification result is that the verification information input by the user does not pass the verification, the control module is configured to control the conduction switch to close the conduction path.

In an example embodiment, the device above further includes: a prompt module, which is configured to prompt, in a form of an interface, the user to input correct verification information when the conduction path is closed or when the verification information input by the user does not pass the verification.

In an example embodiment, the control module is further configured to control, after the transaction is successful, to close the conduction path through the conduction switch.

By means of the technical solution, verification information input by a user is verified before the financial card in the mobile terminal transacts with an external reader and the opening or closing of the conduction path between the financial card and the NFC chip is controlled according to a verification result. In this way, the technical problem that the safety guarantee effect of the mobile payment scheme in the related art is poor, etc., can be solved, and the security during a mobile payment process can further be improved.

BRIEF DESCRIPTION OF THE ACCOMPANYING DRAWINGS

Drawings, provided for further understanding of the present disclosure and forming a part of the specification, are used to explain the present disclosure together with embodiments of the present disclosure rather than to limit the present disclosure. In the accompanying drawings.

DETAILED DESCRIPTION OF EMBODIMENTS

The present disclosure is described below in detail by reference to the accompanying drawings in conjunction with embodiments. It should be noted that the embodiments of the present disclosure and the characteristics of the embodiments can be combined with each other if there is no conflict.

Figure 1:
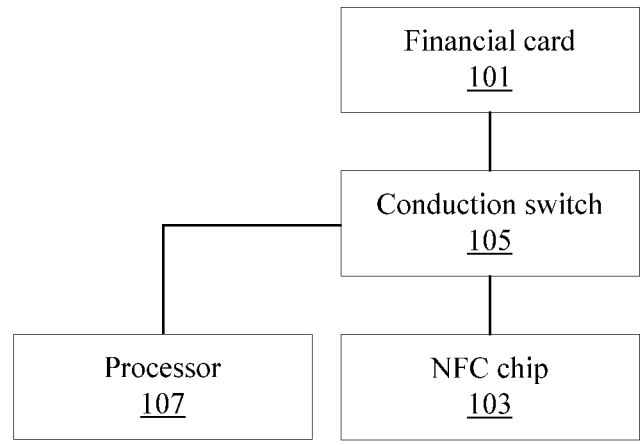
FIG. 1 is a structural block diagram of a mobile terminal according to an embodiment of the present disclosure.

FIG. 1 is structural block diagram of a mobile terminal according to an embodiment of the present disclosure. As shown in FIG. 1, the mobile terminal includes:

a financial card 101 which is used for mobile payment; an NFC chip 103; a conduction switch 105, which is coupled between the financial card 101 and the NFC chip 103, and is configured to receive a control signal from a processor 107 and control the closing or opening of a conduction path between the financial card 101 and the NFC chip 103 according to the control signal; and the processor 107, which is coupled with the conduction switch 105 and is configured to verify, before the financial card 101 transacts with an external reader, verification information input by a user, generate, when the verification information input by the user passes the verification, a control signal for controlling the conduction switch to open the conduction path, and generate, when the verification information input by the user does not pass the verification, a control signal for controlling the conduction switch to close the conduction path.

By means of the above mentioned components, since verification information input by a user is verified before the financial card in the mobile terminal transacts with an external reader, and the opening or closing of the conduction path between the financial card and the NFC chip is controlled by the conduction switch according to a verification result, the technical problem that the safety guarantee effect of the mobile payment scheme is poor, etc. can be solved, and the security during a mobile payment process is effectively improved.

Figure 2:
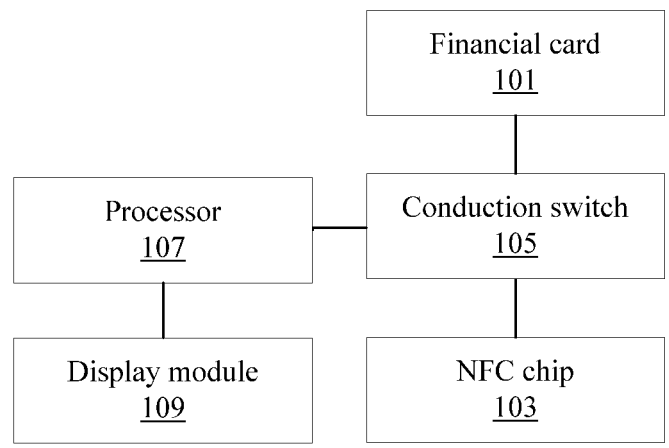
FIG. 2 is another structural block diagram of a mobile terminal according to an embodiment of the present disclosure.

In this embodiment, in order to perform a normal mobile payment in the case where the verification information fails to pass the verification or the conduction path above is in a closed state (i.e. the initial state is that the conduction path is closed) before a transaction, as shown in FIG. 2, the mobile terminal above may further include: a display module 109, which is coupled with the processor 107 and is configured to prompt, in a form of an interface, the user to input correct verification information when the control signal is used for controlling to close the conduction path.

In this embodiment, in order to save running resources, after the transaction is successful, the processor 107 above may further generate a control signal for controlling to close the conduction path so as to close the conduction path in time.

In this embodiment, the financial card 101 above may include but is not limited to one of the following: a SIM card with a built-in SE and a financial IC card.

In order to better understand the embodiment above, detailed description will be made below in combination with an example embodiment of the mobile terminal. The main design idea for the following example embodiment lies in arranging a single wire protocol (SWP) conduction switch at the mobile terminal for connecting the SIM card to the NFC chip. The SWP conduction switch is controlled through a general-purpose input/output (GPIO) port of the mobile phone. When a user performs a card swiping service, a password authentication module 303 is activated, and after the user enters a correct password, a GPIO output signal is sent to open the SWP conduction switch to enable conduction between the NFC chip and the SIM card, so that NFC card swiping service can be performed.

Figure 3:
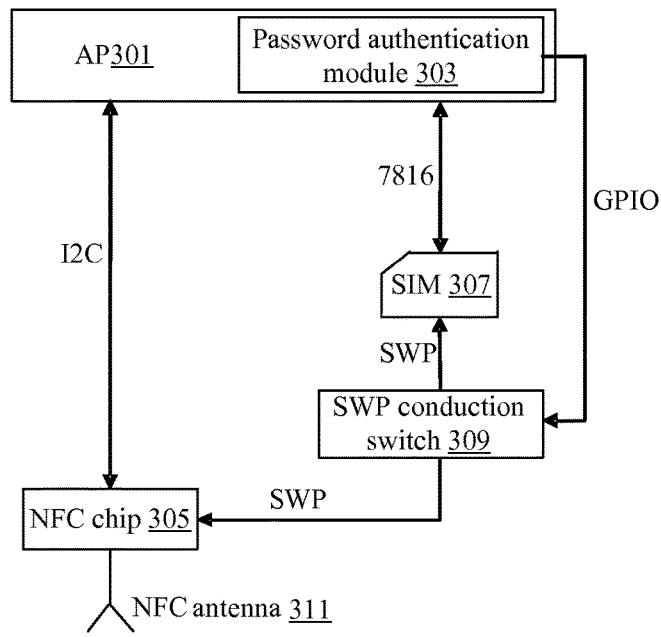
FIG. 3 is a structural schematic diagram of a mobile terminal according to an example embodiment of the present disclosure.

In this example embodiment, a mobile phone is taken as an example for description. As shown in FIG. 3, the mobile terminal includes: an application processor (AP) 301, a password authentication module 303, an NFC chip 305, a SIM card 307 supporting an SE, an SWP conduction switch 309 and an NFC antenna 311.

The AP 301 is coupled with the NFC chip 305 through an I2C bus or using other high-speed buses, such as a serial peripheral interface (SPI) or a high speed universal asynchronous receiver/transmitter (UART) (the high speed UART is referred to as HSU for short).

The AP 301 communicates with the SIM card 307 through an ISO7816 interface, and controls the SWP conduction switch 309 through a GPIO. The SIM card 307 is provided with a built-in secure element (SE), communicates with the AP 301 through an ISO7816 protocol, and communicates with the NFC chip 305 through an SWP.

The password authentication module 303 conducts the SWP conduction switch 309 by controlling the output signal of the GPIO port.

The SWP conduction switch 309 is coupled with the SIM card 307 and the NFC chip 305 through an SWP wire. The SWP conduction switch 309 can conduct or break the connection between the SIM card 307 and the NFC chip 305.

The NFC antenna 311 is coupled with the NFC chip 305 and is configured to transmit radio frequency data. The NFC antenna may be, but is not limited to be, attached to the backside of a battery or the inside of the rear cover of a mobile phone.

Figure 4:
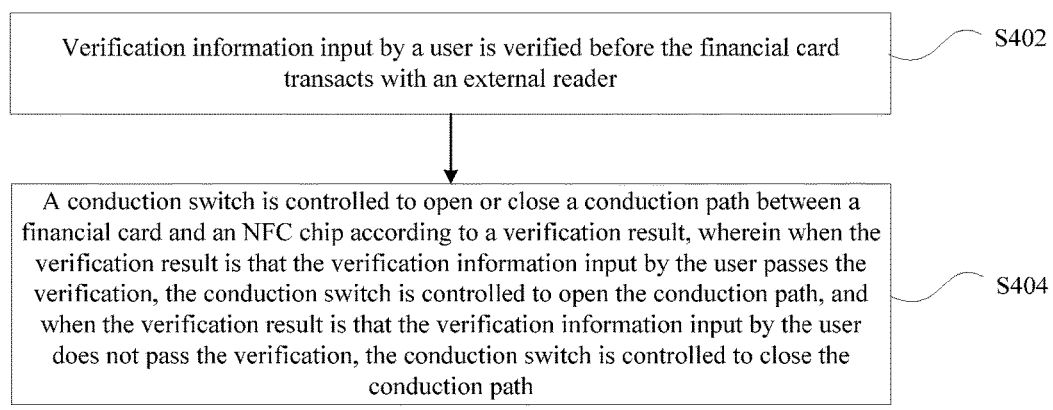
FIG. 4 is a flow diagram of a safety verification method for mobile payment according to an embodiment of the present disclosure.

FIG. 4 is a flow diagram of a safety verification method for mobile payment according to an embodiment of the present disclosure. In this embodiment, the method is implemented through a conduction switch, which is connected between an NFC chip and a financial card used for mobile payment, in a mobile terminal As shown in FIG. 4, the method includes:

Step S402, verification information input by a user is verified before the financial card transacts with an external reader.

Step S404, the conduction switch is controlled to open or close a conduction path between the financial card and the NFC chip according to a verification result, wherein when the verification result is that the verification information input by the user passes the verification, the conduction switch is controlled to open the conduction path, and when the verification result is that the verification information input by the user does not pass the verification, the conduction switch is controlled to close the conduction path above.

By means of various steps above, the technical problem that the safety guarantee effect of the mobile payment scheme is poor, etc. can be solved, and the security during a mobile payment process is effectively improved.

In this embodiment, when an initial state of the conduction path is that the conduction path is closed or when the verification information input by the user does not pass the verification, a user may be prompted, in a form of an interface, to input correct verification information.

In order to save resources, after the transaction is successful, the conduction path above is controlled to be closed through the conduction switch.

Figure 5:
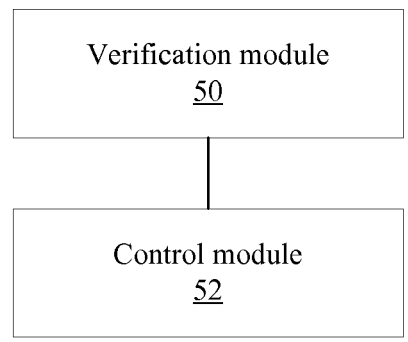
FIG. 5 is a structural block diagram of a safety verification device for mobile payment according to an embodiment of the present disclosure.

A safety verification device for mobile payment is further provided in this embodiment. The device is implemented through a conduction switch, which is connected between a near field communication (NFC) chip and a financial card used for mobile payment, in a mobile terminal and is adopted for realizing the above-mentioned embodiments and example implementations, which has been described, thereby needing no further description, and modules involved in the device are described below. As used below, the term "module" is a combination of software and/or hardware capable of realizing predetermined functions. Although the device described in the embodiment blow may be preferably realized with software, hardware or the combination of software and hardware are also possible and can be conceived. FIG. 5 is a structural block diagram of a safety verification device for mobile payment according to an embodiment of the present disclosure. As shown in FIG. 5, the device includes:

a verification module 50, which is coupled with a control module 52 and is configured to verify, before the financial card transacts with an external reader, verification information input by a user; and the control module 52, which is configured to control the conduction switch to open or close a conduction path between the financial card and the NFC chip according to a verification result, wherein when the verification result is that the verification information input by the user passes the verification, the control module is configured to control the conduction switch above to open the conduction path, and when the verification result is that the verification information input by the user does not pass the verification, the control module is configured to control the conduction switch to close the conduction path.

Figure 6:
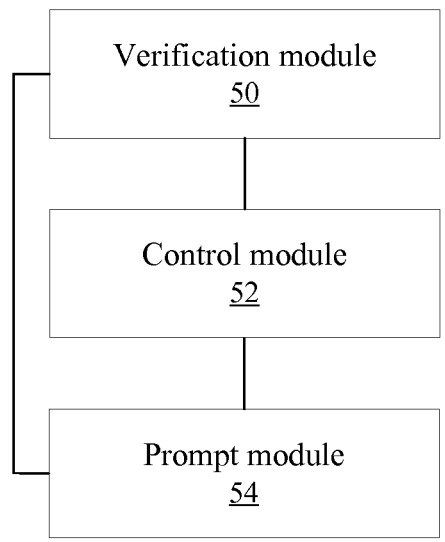
FIG. 6 is another structural block diagram of a safety verification device for mobile payment according to an embodiment of the present disclosure.

In this embodiment, as shown in FIG. 6, the device above may further include but is not limited to the following: a prompt module 54, which is configured to prompt, in a form of an interface, the user to input correct verification information when the conduction path is closed or when the verification information input by the user does not pass the verification. The function of the prompt module 54 may also be realized through the control module 52 and a display module (for example, a display screen) of the mobile terminal.

In an example embodiment, in order to save resources, the control module 52 above is further configured to control, after the transaction is successful, to close the conduction path through the conduction switch.

In combination with an example embodiment, a solution of using the technical solution of the above embodiments to realize a mobile payment is described below. The implementation method for mobile payment in this embodiment may be realized based on the mobile terminal shown in FIG. 3, but is not limited to this.

Manner I: before an NFC card swiping transaction is performed, if the SWP conduction switch 309 is closed, the user needs to start the password authentication module 303 and input the correct password, and if the password input by the user passes the verification, the password authentication module sets an output signal of the GPIO port to control the SWP conduction switch 309 to open the SWP connection. In this way, the SWP connection between the NFC chip 305 and the SIM card 307 is opened. If the password input by the user is wrong, the password authentication module refuses to open the path between the NFC chip 305 and the SIM card 307, and at this time, the mobile phone cannot perform an NFC card swiping service. When the password input by the user is correct and the SWP path is opened, the mobile phone may be brought in proximity to the Pos machine to perform an NFC card swiping service; the Pos machine will exchange, through a wireless communication protocol, data with the NFC chip 305 through the NFC antenna 311, and the NFC chip 305 will exchange, through an SWP protocol, data with the SIM card 307, in other words, the Pos machine reads relevant information in the SIM card. After the transaction is successful, the NFC chip 305 report a card swiping success event to the AP 301 of the mobile phone through an I2C. The AP side will automatically call the password authentication module 303 to control the output signal of the GPIO port, so as to close the SWP conduction switch to close the path between the NFC chip 305 and the SIM card 307.

Manner II: before a card swiping transaction is performed, the user may forget to open the SWP conduction switch 309 through the password authentication module 303. At this time, when the mobile phone is brought in proximity to the POS machine, the NFC chip 305 will detect that there is no path between the NFC chip 305 and the SIM card 307, and then feed back same to the AP 301 of the mobile phone through the I2C. The AP side automatically starts the password authentication module, and pops up a prompt interface to prompt the user that the SWP conduction switch needs to be opened through the password authentication module. After the user opens the SWP conduction switch 309 through the password authentication module, the mobile phone is brought in proximity to the Pos machine again to perform an NFC card swiping service. After the card swiping transaction is successful, the NFC reports a card swiping success event to the AP 301 of the mobile phone, and the AP side automatically call the password authentication module to close the SWP path.

Figure 7:
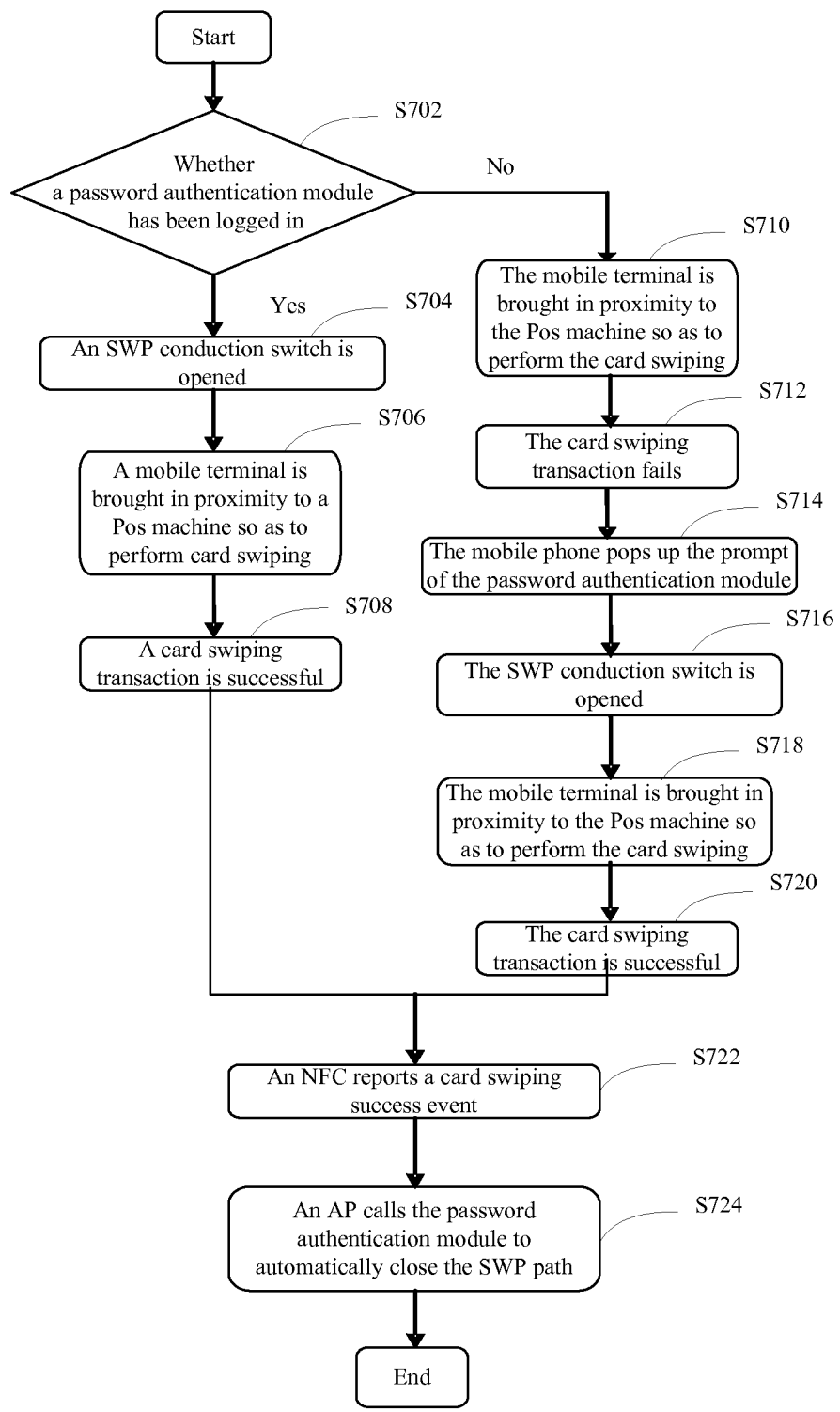
FIG. 7 is a flow diagram of an implementation method for mobile payment according to an example embodiment of the present disclosure.

In order to better understand the implementation process above, detailed description will be made below in combination with the flow shown in FIG. 7. FIG. 7 is a flow diagram of an implementation method for mobile payment according to an example embodiment of the present disclosure. As shown in FIG. 7, the method includes:

Step S702, before an NFC card swiping transaction is performed, it is detected whether a password authentication module has been logged in; if so, the process goes to step S704; otherwise, the process goes to step S710.

Step S704, an SWP conduction switch is opened and the process goes to step S706.

Step S706, a mobile phone is brought in proximity to a Pos machine so as to perform card swiping, and the process goes to step S708.

Step S708, the card swiping transaction is successful, and the process goes to step S722.

Step S710, the mobile phone is brought in proximity to the Pos machine so as to perform card swiping, and the process goes to step S712.

Step S712, the card swiping transaction fails, and the process goes to step S714.

Step S714, the mobile phone pops up a password authentication module and the process goes to step S716.

Step S716, the SWP conduction switch is opened.

Step S718, the mobile phone is brought in proximity to the Pos machine so as to perform card swiping, and the process goes to step S720.

Step S720, the card swiping transaction is successful.

Step S722, an NFC reports a card swiping success event.

Step S724, an AP calls the password authentication module to automatically close the SWP path, and the process ends.

In summary, the embodiments of the present disclosure realize the following beneficial effects: in the related art, there is no effective protection measures with regard to the problem resulted by the losing of a mobile phone with NFC card swiping function, and by means of the solution provided in the embodiments above, an illegal personnel can be effectively prevented from performing an illegal card swiping service. In the embodiments above, a user sets a password to control a GPIO port signal for conducting an SWP switch, and after being conducted, the switch can perform an NFC card swiping service normally. When the SWP path is closed, at this time, there is no influence on other functions of the NFC, and point to point (P2P) and a card reader are used as usual, but only the card swiping service is not supported. The GPIO port signal is controlled by setting a password, and thus the SWP switch can be controlled to be conducted. If the SIM card does not save bank card password information, during card swiping, the password of the SWP conduction switch and the bank card password need to be input, so that the function of double protection can be achieved, and thus illegal stealing is prevented effectively.

In another embodiment, software is further provided, and the software is used to execute the technical solutions described in the above-mentioned embodiments and example implementations.

In another embodiment, a storage medium is further provided, wherein the storage medium stores the software above, and the storage medium includes but is not limited to: optical disk, floppy disk, hard disk, erasable memory, etc.

INDUSTRIAL APPLICABILITY

By means of the technical solution provided in the present disclosure, verification information input by a user can be verified before a financial card in a mobile terminal transacts with an external reader, and the opening or closing of a conduction path between the financial card and an NFC chip can be controlled according to a verification result, which can further improve the security during a mobile payment process.

Obviously, a person skilled in the art would understand that the above modules and steps of the present disclosure can be realized by using a universal computing device, can be integrated in a single computing device or distributed on a network that consists of a plurality of computing devices, and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only the example embodiment of the present disclosure, which are not used to restrict the present disclosure, for those skilled in the art, the present disclosure may have various changes and variations. Any amendments, equivalent substitutions, improvements, etc. within the principle of the disclosure are all included in the scope of the protection defined by the appended claims of the disclosure.

What is claimed is:

1. A mobile terminal, comprising: a financial card, which is used for mobile payment, and a near field communication (NFC) chip, and the mobile terminal further comprising:
   a conduction switch, which is coupled between the financial card and the NFC chip, and is configured to receive a control signal from a processor and control, according to the control signal, closing or opening of a conduction path between the financial card and the NFC chip; and
   the processor, which is coupled with the conduction switch and is configured to verify, before the financial card transacts with an external reader, verification information input by a user, generate, when the verification information input by the user passes the verification, a control signal for controlling the conduction switch to open the conduction path, and generate, when the verification information input by the user does not pass the verification, a control signal for controlling the conduction switch to close the conduction path.

2. The mobile terminal as claimed in claim 1, further comprising:
   a display module, which is coupled with the processor and is configured to prompt, in a form of an interface, the user to input correct verification information when an initial state of the conduction path is that the conduction path is closed or when the verification information input by the user does not pass the verification.

3. The mobile terminal as claimed in claim 1, wherein the processor is further configured to generate, after the transaction is successful, a control signal for controlling to close the conduction path.

4. The mobile terminal as claimed in claim 1, wherein the financial card comprises one of the following: a subscriber identity module (SIM) card with a built-in secure element (SE) and a financial integrated circuit (IC) card.

5. A safety verification method for mobile payment, which is implemented through a conduction switch, that is coupled between a near field communication (NFC) chip and a financial card used for mobile payment, in a mobile terminal, wherein the method comprises:
   verifying, before the financial card transacts with an external reader, verification information input by a user; and
   controlling the conduction switch to open or close a conduction path between the financial card and the NFC chip according to a verification result, when the verification result is that the verification information input by the user passes the verification, controlling the conduction switch to open the conduction path, and when the verification result is that the verification information input by the user does not pass the verification, controlling the conduction switch to close the conduction path.

6. The method as claimed in claim 5, further comprising: prompting, in a form of an interface, the user to input correct verification information when an initial state of the conduction path is that the conduction path is closed or when the verification information input by the user does not pass the verification.

7. The method as claimed in claim 5, further comprising: after the transaction is successful, controlling to close the conduction path through the conduction switch.

8. A safety verification device for mobile payment, which is implemented through a conduction switch, that is coupled between a near field communication (NFC) chip and a financial card used for mobile payment, in a mobile terminal, wherein the device comprises:
   a verification module, which is configured to verify, before the financial card transacts with an external reader, verification information input by a user; and
   a control module, which is configured to control the conduction switch to open or close a conduction path between the financial card and the NFC chip according to a verification result, wherein when the verification result is that the verification information input by the user passes the verification, the control module is configured to control the conduction switch to open the conduction path, and when the verification result is that the verification information input by the user does not pass the verification, the control module is configured to control the conduction switch to close the conduction path.

9. The device as claimed in claim 8, further comprising:
   a prompt module, which is configured to prompt, in a form of an interface, the user to input correct verification information when the conduction path is closed or when the verification information input by the user does not pass the verification.

10. The device as claimed in claim 8, wherein the control module is further configured to control, after the transaction is successful, to close the conduction path through the conduction switch.

11. The mobile terminal as claimed in claim 2, wherein the financial card comprises one of the following: a subscriber identity module (SIM) card with a built-in secure element (SE) and a financial integrated circuit (IC) card.

12. The mobile terminal as claimed in claim 3, wherein the financial card comprises one of the following: a subscriber identity module (SIM) card with a built-in secure element (SE) and a financial integrated circuit (IC) card.

13. The method as claimed in claim 6, further comprising:
   after the transaction is successful, controlling to close the conduction path through the conduction switch.

14. The device as claimed in claim 9, wherein the control module is further configured to control, after the transaction is successful, to close the conduction path through the conduction switch.

* * * * *

UNITED STATES PATENT AND TRADEMARK OFFICE
CERTIFICATE OF CORRECTION

PATENT NO. : 9,848,326 B2
APPLICATION NO. : 14/896544
DATED : December 19, 2017
INVENTOR(S) : Mingtao Gu et al.

It is certified that error appears in the above-identified patent and that said Letters Patent is hereby corrected as shown below:

On the Title Page

Item (73), Assignee should read:
-- XI'AN ZHONGXING NEW SOFTWARE CO. LTD.
XI'AN, CHINA --

Signed and Sealed this
Eleventh Day of September, 2018

Andrei Iancu
*Director of the United States Patent and Trademark Office*